United States Patent
Lev

(10) Patent No.: US 9,375,804 B2
(45) Date of Patent: Jun. 28, 2016

(54) LOW PRESSURE ELECTRON BEAM WELDING OF LI-ION BATTERY CONNECTIONS

(75) Inventor: Leonid C. Lev, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1152 days.

(21) Appl. No.: 13/191,505

(22) Filed: Jul. 27, 2011

(65) Prior Publication Data

US 2013/0029206 A1    Jan. 31, 2013

(51) Int. Cl.
| H01M 2/26 | (2006.01) |
| B23K 35/38 | (2006.01) |
| B23K 15/10 | (2006.01) |
| B23K 15/00 | (2006.01) |
| H01M 2/20 | (2006.01) |
| H01M 10/0525 | (2010.01) |

(52) U.S. Cl.
CPC .............. *B23K 15/0006* (2013.01); *B23K 15/10* (2013.01); *H01M 2/206* (2013.01); *H01M 10/0525* (2013.01); *H01M 2220/20* (2013.01); *Y02E 60/122* (2013.01); *Y02T 10/7011* (2013.01); *Y10T 29/49108* (2015.01)

(58) Field of Classification Search
None
See application file for complete search history.

(56) References Cited

U.S. PATENT DOCUMENTS

| 3,585,348 | A  | * | 6/1971  | Eckstein    | 219/121.13 |
| 4,080,526 | A  | * | 3/1978  | Kihara et al. | 219/121.22 |
| 4,464,560 | A  | * | 8/1984  | Church et al. | 219/137.42 |
| 6,317,248 | B1 | * | 11/2001 | Agrawal et al. | 359/265 |
| 2005/0132562 | A1 | * | 6/2005  | Saito et al. | 29/623.5 |
| 2010/0316897 | A1 |   | 12/2010 | Kozuki et al. | |

FOREIGN PATENT DOCUMENTS

| CN | 101369671 A | 2/2009 |
| CN | 102027619 A | 4/2011 |
| CN | 102197530 A | 9/2011 |
| DE | 4111876 A1  | 10/1991 |

\* cited by examiner

*Primary Examiner* — Barbara Gilliam
*Assistant Examiner* — Adam A Arciero
(74) *Attorney, Agent, or Firm* — Reising Ethington P.C.

(57) ABSTRACT

A method for connecting individual lithium ion cells into a battery suited for powering an electric or hybrid vehicle is disclosed. The cell current collectors are electron beam welded to one another and to a connector tab in an substantially oxygen-free atmosphere. The cell current collectors and the connector tab are temporarily secured with a clamp, one portion of which has an opening. The electron beam size may be controlled, by magnetic coils and by the extent of electron scattering by the gas atmosphere, to minimally fill the clamp opening to minimize any irradiation of the clamp. The beam or the workpieces may be displaced, if required, fuse the entire opening area. A similar procedure may be followed to weld a plurality of connector tabs to a busbar.

16 Claims, 4 Drawing Sheets

LOW PRESSURE ELECTRON BEAM WELDING OF LI-ION BATTERY CONNECTIONS

TECHNICAL FIELD

This invention pertains to systems and methods of fabricating low resistance electrical interconnections between a plurality of lithium ion cells to form a battery, particularly a high voltage battery suitable for propelling an electric or hybrid vehicle.

BACKGROUND OF THE INVENTION

High voltage batteries with voltages of up to 400 volts, or higher, when fully charged, are employed for on-board energy storage in hybrid or electric vehicles.

These batteries are assemblies of multiple cells, which, in current practice often employ a Li-ion (lithium ion) chemistry. These cells, which individually develop about 4 volts, are at least connected in series to develop the required voltage and may optionally be connected in parallel to develop the required energy storage capacity. Each cell-to-cell connection should have the lowest possible electrical resistance to minimize the overall internal resistance of the battery and enhance its performance Most commonly ultrasonic welding, a process for making a solid state weld without melting the workpieces is a preferred joining process.

Batteries are progressively assembled and constructed by sequential addition of a number of smaller entities and require electrical interconnections. The starting point is the fabrication of anodes and cathodes by the laying down of appropriate materials on thin foil metal current collectors which range in thickness from about 10 to 20 micrometers thick. The anode material is often graphite-based and laid down on a copper current collector. The cathode may be lithium manganese oxide ($LiMn_2O_4$), or other manganese-containing compounds like nickel-manganese-cobalt oxide $Li(Ni_xMn_yCo_z)O_2$, or lithium aluminum manganese oxide ($Li_xAl_yMn_{1-y}O_2$) and laid down on an aluminum cathode. Normally the current collector is more extensive than the electrode, leaving a portion of the metal foil current collector extending beyond the electrode area.

A pouch cell is formed by stacking a spaced apart series of anodes and cathodes with interposed electrolyte-soaked separators in facing relation and sealing them within a soft-sided container. All of the anode current collectors may then be gathered together and attached, as a group, to an anode tab which may be about 200 micrometers thick. Similarly, all of the cathode current collectors may be gathered together and connected to a cathode tab, which, again, is about 200 micrometers thick. Commonly the cathode tab is aluminum for compatibility with the cathode foils but the anode tab may be copper or nickel or nickel-plated copper.

Therefore, the pouch cell may contain a plurality of Li-ion cells, connected in parallel. Commonly three pouch cells are connected in parallel by welding together their anode or cathode tabs, often to a busbar or like current-carrying connector. By connecting these groups of three pouch cells in series modules may be produced, with the modules, in turn, being assembled into a battery pack.

The tabs for each cell are thin sheets, about 200 micrometers thick which may be up to about 45 millimeters in width. In fabricating a pouch a large number, typically up to about 20, and sometimes in excess of 60, current collector foils, are welded to one another and to the tab. In current practice, during the pouch welding operation, a workpiece stack, comprising the current collector foils and the tab, is clamped between the opposing faces of an ultrasonic welder. The tool faces are then ultrasonically excited, inducing the current collector foils to slide back and forth relative to one another at high frequency, usually from about 20 to 40 kHz. This high frequency sliding generates heat and fragments and disperses the oxides and surface films between the workpieces to expose fresh metal surface and enable a metallurgical bond without melting the materials.

A similar procedure may be followed when parallel-connecting the pouches. In this case, the tabs will be about 200 micrometers thick and the busbar may be about 500 to 1000 micrometers thick, resulting in a somewhat thicker workpiece stack.

The ultrasonic welding tool faces may be square or rectangular in plan view and may be textured or knurled. Typical tool dimensions, and hence weld dimensions may be about 4-10 millimeters on a side, with a 10 millimeter wide by 4 millimeter high tool being common. Several such welds are commonly used, spaced generally equal distances apart and arranged end to end across the foil width.

In service, these foils and welds are subject to appreciable loadings, both mechanical and thermal. Under these loadings one or more of the weld patches, or the zone immediately adjacent to the weld patch may develop tears and/or cracks, reducing battery capability and over time, promoting battery failure. There is therefore need for additional welding and joining processes for battery cell interconnections, both foil to tab and tab to busbar, to produce lower resistance interconnections and stronger joints. Such welding and joining processes are particularly important for lithium-ion cells extensively employed in high voltage vehicle propulsion batteries.

SUMMARY OF THE INVENTION

It is an object of this invention to provide, in a high voltage battery suitable for powering a hybrid or electric vehicle, robust, low electrical resistance, electron beam fusion welds connections with reduced susceptibility to weld tearing or fracture during service. The welds may be made between a plurality of 10-20 micrometer thick, cell current collectors and a 200 micrometer or so thick connector tab. Welds may also be made between a plurality of such 200 micrometer thick tabs and a 500-1000 micrometer thick busbar. Such fusion welded connections may be fabricated in a joint area which may extend for the entire width of the connector, without any physical contact between a weld tool and the workpiece. The melting and commingling of the connectors engages all material in the joint area, so that the weld area is generally equal to the joint area, promoting increased strength and reduced electrical resistance.

Thermal loads, which may be significant in degrading the quality of an electrical connection, may arise due to the temperature mismatches between electrical elements. Such temperature mismatches may arise for two reasons. First is the difference in the thickness of individual elements which influence their inherent electrical resistance, and hence their heat generation and dissipation behavior. A second reason is the enhanced heat generation which may result from higher electrical resistance joints between the individual circuit elements.

Sufficiently large stresses may promote fracture and tearing of the workpiece layers and may eventually lead to complete disconnection of the tabs from one or more of the current collector foils and/or the disconnection of one or more tabs from the busbar assembly. Such fracture and disconnection will result in at least reduced battery capability, and, if the process continues, may result in battery failure.

Fusion welding has the potential to promote stronger, lower resistance welds but the thin workpieces, 10 to 20 micrometers for the current collectors and 200 micrometers for the tabs, makes reliably obtaining suitable fusion welds challenging. But a process which is well-adapted to the challenge of reproducibly welding such thin workpieces is non-vacuum electron beam fusion welding. Non-vacuum electron beam welding employs a beam of electrons which will penetrate a workpiece to depth measured in micrometers before being absorbed by the workpiece and generating heat internal to the workpiece. Such systems may deliver between 2 and 4 kW of power and employ accelerating voltages of up to 150 kV with beam currents of up to 50 mA but high power systems capable of beam currents of up to 1000 mA are available.

An electron beam weld may be achieved at or near atmospheric pressure, about 760 Ton or about 100 Pa. The atmosphere may be a substantially oxygen-free argon-helium mixture which may interact with the electron beam and cause it to become defocused, spreading the electron beam over a wider area of the workpiece. The defocusing action of the argon-helium atmosphere may be effective in minimizing the need for steering the beam to achieve a wide coverage weld.

The current collector foils and tab, collectively form a workpiece and may be clamped, with the collector foils directly exposed to the electron beam, between two sheet-like clamps, one of which is equipped with a window defining the weld zone. The workpiece should be positioned below the electron beam source. The electron beam will irradiate the exposed windowed area of the foils and tab. Initially the incident electrons will be absorbed by the uppermost foil, heating and melting the foil. Beneficially the absorption of electrons by metals and alloys is substantially unaffected by whether it is solid or liquid. So any gaps between foil layers will be filled as the liquid pool flow downward under gravity as the electron beam continues to be absorbed by the molten pool. Heat will propagate down the workpiece stack by conduction, expanding and progressively propagating the weld pool down the workpiece stack until the foils and tab form a single, homogeneous weld pool. It is preferred, since this is a fusion welding process, to conduct the process with the workpiece oriented horizontally to minimize flow of liquid from the weld zone and ensure that the fused-together weld region be of generally uniform thickness. By traversing the clamp under a stationary electron beam, or by steering the electron beam over a stationary clamp or any combination of these actions, the electron beam may traverse the entire windowed area in the clamp and fuse the foils and tab over any desired area.

While the shape and extent of the weld zone may be defined by the clamp opening, it is not intended that the clamp function to permit or deny access of the electron beam to the workpiece. The extent of the electron beam impinging on the workpiece should always be less than the clamp opening dimension so that no direct interaction between clamp and electron beam may occur. The weld pool dimension may be primarily controlled by controlling the size and shape of the electron beam. If the desired weld area exceeds the electron beam dimension, the beam may be scanned or traversed using deflection coils or the sample may be positioned on a movable table and traversed under a stationary electron beam. Thus any desired weld shape may be obtained and the weld properties, to the extent that they depend on weld shape, may be readily adjusted.

The materials selected for the clamp preferably should not react with the molten metal and should not be wet by the molten metal. It is also desirable that the clamp surface be smooth or even polished so that no mechanical interaction occurs between the weld and clamp due to infiltration of surface cavities by the liquid metal and subsequent mechanical engagement of the cavity by the solidified metal. Candidate clamp materials may include: steels, cemented carbides, graphite, molybdenum, nickel and nickel based alloys, aluminum oxide, $Al_2O_3$, zirconium oxide $ZrO_2$ and others.

The clamp is intended to function as a heat sink and extract at least the latent heat of fusion from the weld pool to promote rapid throughput. If convective cooling in the gas atmosphere is inadequate to maintain a suitably low temperature in the clamp it may be actively cooled, for example by passage of flowing coolant.

These and other aspects of the invention are described below, while still others will be readily apparent to those skilled in the art based on the descriptions provided in this specification.

DESCRIPTION OF PREFERRED EMBODIMENTS

High voltage batteries with appreciable energy storage capability, often of the lithium-ion type, continue to find application in hybrid and electric vehicles as energy storage systems for electric motor drive systems. Such batteries may develop voltages, when fully charged, of greater than 200 volts, most commonly between 200 and 400 volts. This is appreciably greater than the voltage generated by a single cell, of any chemistry, and may be generated only by electrically connecting a plurality of single cells in series. These cell-to-cell connections may be a source of internal resistance of the battery.

Internal resistance is undesirable since it reduces the battery voltage under load and generates heat. For at least these reasons the resistance of all of the internal battery connections should be a low as possible. Each cell will have two connectors, one corresponding to the anode, the other to the cathode. In cell construction the anode and cathode are supported on thin foil current collectors, each less than 20 micrometers in thickness. These foil current collectors, usually copper for the anode and aluminum for the cathode, serve as connectors when attaching the cell to another cell or to an external circuit.

Often the energy storage capacity of an individual cell is less than is required for the battery so that a number of cells are connected in parallel to develop the required capacity. These grouped, parallel-connected cells, may be charged with electrolyte and sealed within a soft-sided pouch. Up to about 36 pouches may then be assembled into a module, first by connecting 3 or so cells in parallel to increase the storage capability of the module and then connecting these parallel-connected groups of cells in series to increase the module voltage.

Figure 1:
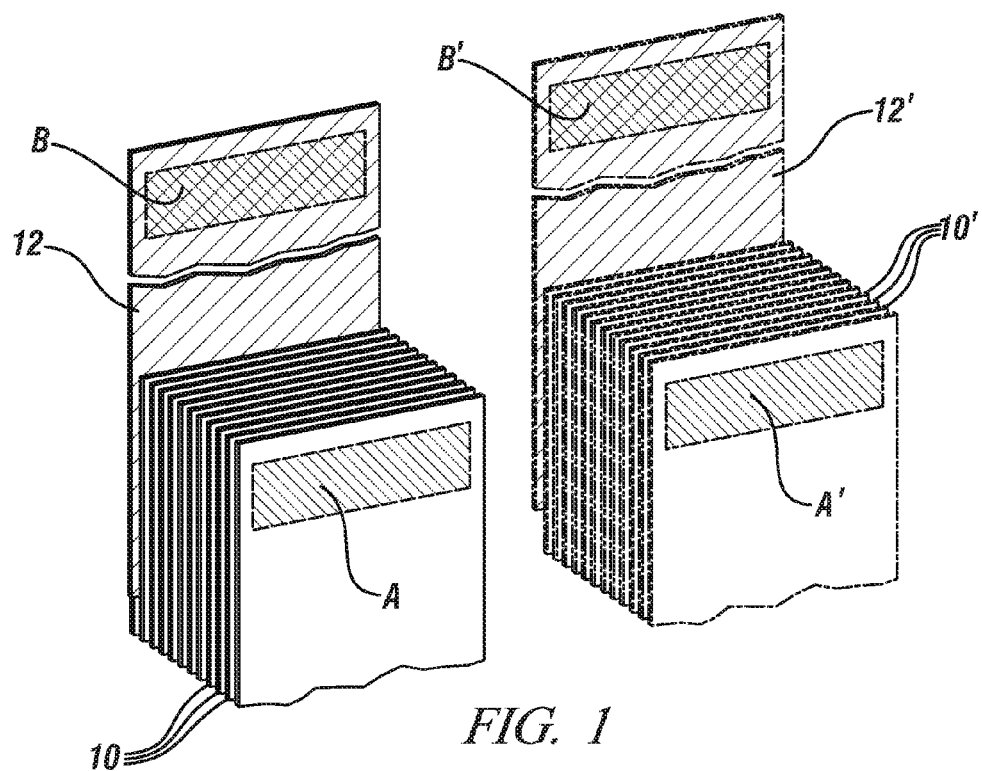
FIG. 1 shows, in perspective view, a weld stack-up consisting of a number of current collector foils and a tab.
Figure 2:
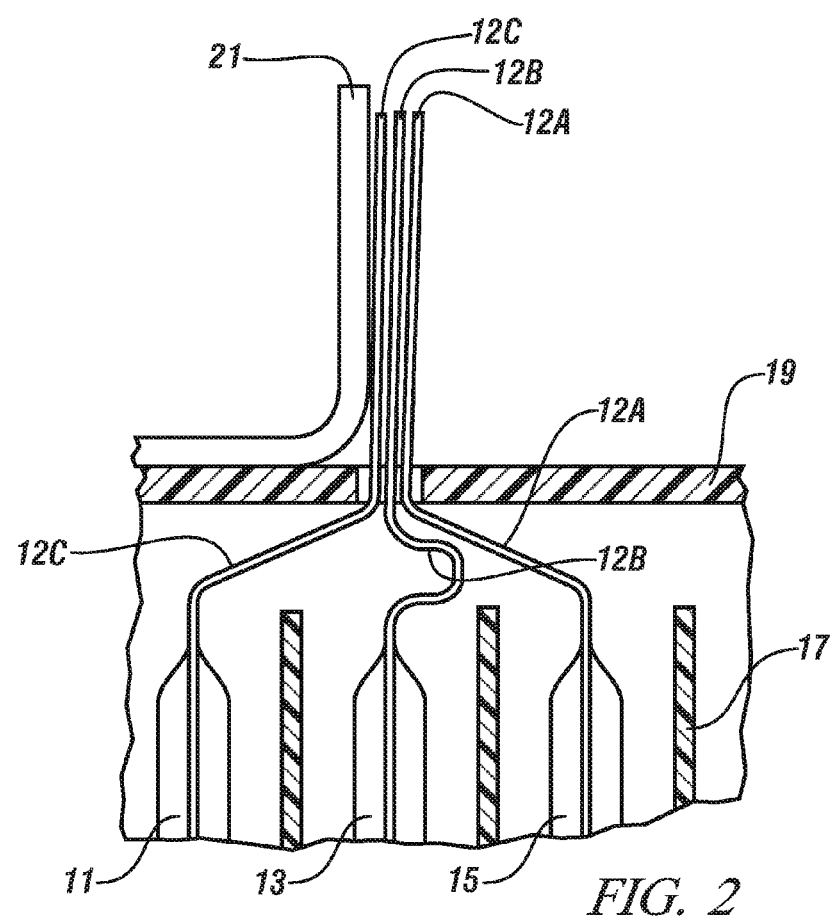
FIG. 2 shows, in side view, a weld stack-up consisting of three tabs, each associated with a specific pouch, and a busbar.

To fabricate a pouch, a series of cells each comprising an anode and a cathode are assembled and placed in a pouch (not shown). The 10 to 20 micrometer thick current collectors 10 from the anodes of each of the cells to be included in the pouch may be gathered together as one stack and the current collectors 10' (shown in ghost) from the cathodes of each cell gathered together as a second stack. Both the anode and cathode current collector stacks are then welded to their respective 200 micrometer or so thick tabs, 12 (for the anode) and 12' (for the cathode) at locations generally indicated as A and A'. Connections between the tabs 12, 12' and a bus bar (not shown) are made at about B and B' and an exemplary configuration for the anode bus bar connection, is shown in FIG. 2. FIG. 2 shows three pouches 11, 13 and 15 among others (not shown) which are positioned in a casing (not shown) and supported by supports 17. Tabs 12A, 12B and 12C are directed through casing lid 19 and brought into contact with busbar 21. Bus bar 21 may be suitably connected to execute series connections between parallel-connected pouches 11, 13 and 15 and similar pouches (not shown) similarly disposed in the casing (not shown).

Figure 3:
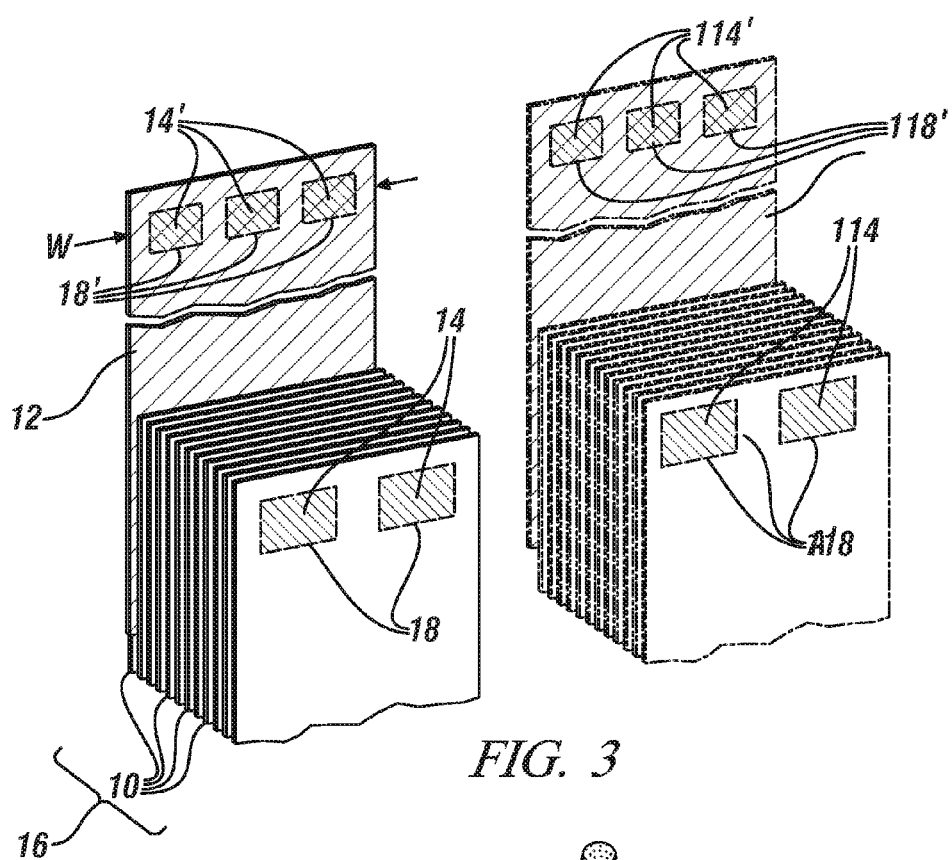
FIG. 3 shows, in perspective view, a representation of the prior art attachment of the foils and tab of FIG. 1 using a number of ultrasonic welds made using textured tools.

To minimize the connection resistance when parallel connecting the cells, welding is a preferred connection method. Current practice, is shown in FIG. 3. Tab 12 is connected to the stack 16 of foils 10 using a number of linearly arranged ultrasonic welds 14 across the width of tab 12. Commonly, two welds are preferred, but more or fewer welds may be used. The ultrasonic welds on the anode are made by clamping foil stack 16 and tab 12 between aligned weld tools (not shown) and ultrasonically exciting at least one of the weld tools to induce abutting foil and tab faces to rub together. The rubbing action generates heat due to friction and also serves to fracture and displace any surface oxide layer, permitting metal-to-metal contact and promote formation of a solid state weld. The process may be assisted by knurling or texturing the weld tools to increase the local pressure in selected areas of the weld tool footprint. A similar process is followed when welding tab 12 to a busbar (not shown) resulting a series of spaced apart, end to end welds arranged to generally span the width of the tab 12. A similar configuration of welds is shown as 114 and 114' on the cathode.

In service, such a connection will be subject to both mechanical and thermal stresses. Thermal stresses arise due to the different thermal masses of the thin current collector foils, the thicker tab and the relatively massive weld. This difference in thermal mass results in different heating and cooling rates for the foils, tab and weld so that these elements will be a different temperatures resulting in differing degrees of thermal expansion and thereby inducing stresses. The sign and magnitude of the stresses will vary with battery operating conditions and may, over time, develop cracks or tears in or adjacent to the welds. Tears located at weld edges 18, 18', 118, 118' (FIG. 3) have been particularly prevalent, and may sometimes be observed at all of the welds. Such tears may propagate to eventually sever any connection between the foils 10 and tab 12, leading to battery failure, but even partial failure, such as tears at edges 18, 18' 118, 118' are undesirable since they will further increase the joint resistance and so further increase the internal heat generation in the battery.

As shown in FIG. 3 a series of individual welds, arranged across the tab surface, may be employed rather than a single weld spanning the width W of tab 12. But even though some welds may be stronger than others, these individual welds may not provide adequate support to resist the thermal and mechanical loads they experience. So a tear or failure at a first weld may progressively promote similar tears or fractures at a second, third or additional weld.

Some of these issues may be at least alleviated, if not resolved, by expanding the weld footprint to extend the full width, about 45 millimeters or so, of the tab. But this presents some challenges for ultrasonic welding: the power requirements increase substantially; and, maintaining uniform pressure to promote uniform oxide removal across such a width is difficult. The difficulty of maintaining uniform pressure is further exacerbated by any variability in tool wear occurring on the workpiece-contacting tool face.

A more promising approach is to employ fusion welding. Fusion welding may also offer an opportunity to engage the entire weld zone area, and, in forming a homogeneous weld pool, promises a stronger and lower resistance joint than may be obtained using ultrasonic welding. But controlling the heat input to such a fusion welding process may be challenging in such thin workpieces. The problem of is particularly acute when welding aluminum, due to the initial presence of a non-conducting oxide layer on its surface.

The behavior of the aluminum may vary greatly as the oxide layer is penetrated or removed leading to a need to vary the weld parameters depending on the state of the oxide film. Frequently, a high power input is required to overcome the insulating effect of the oxide layer but, once melting is initiated and the oxide layer begins to disperse a much lower power input is needed. Particularly with such thin workpieces, any delay in reducing the power input may vaporize or severely damage at least some of the connectors. Alternatively, if, to avoid excess heat input, the heat input is reduced, there is a risk that no or limited fusion will occur, resulting in a high resistance, low strength joint.

Fusion welding may be achieved using contact and non-contact methods. A preferred contact method is electric resistance spot welding but, in addition to the challenges of the surface oxide, any contact approach will be subject to the same alignment and wear issues that affect ultrasonic welding. So non contact fusion welding approaches are preferred.

Options include laser welding and electron beam welding but the laser energy interacts and couples with the surface of the workpiece so the presence or absence of the oxide layer and the attendant changes and variability in surface reflectivity render this process unattractive. Also lasers typically transfer only a small portion, possibly as little as 3-5%%, of the incident laser energy into a metal workpiece surface. Also, for aluminum in particular, the changes in reflectivity occurring during melting create issues of risking a cold weld, or vaporizing some of the connector(s).

Low pressure electron beam welding does not suffer from these deficiencies. In electron beam welding the electrons penetrate a short distance into the sample to generate heat internal to the workpiece. The penetration depends on the accelerating voltage and inversely on the atomic number of the workpiece. For example 30 kV electrons may penetrate about 2 micrometers in copper and 60 kV electrons penetrate about 10 micrometers in aluminum.

Figure 4:
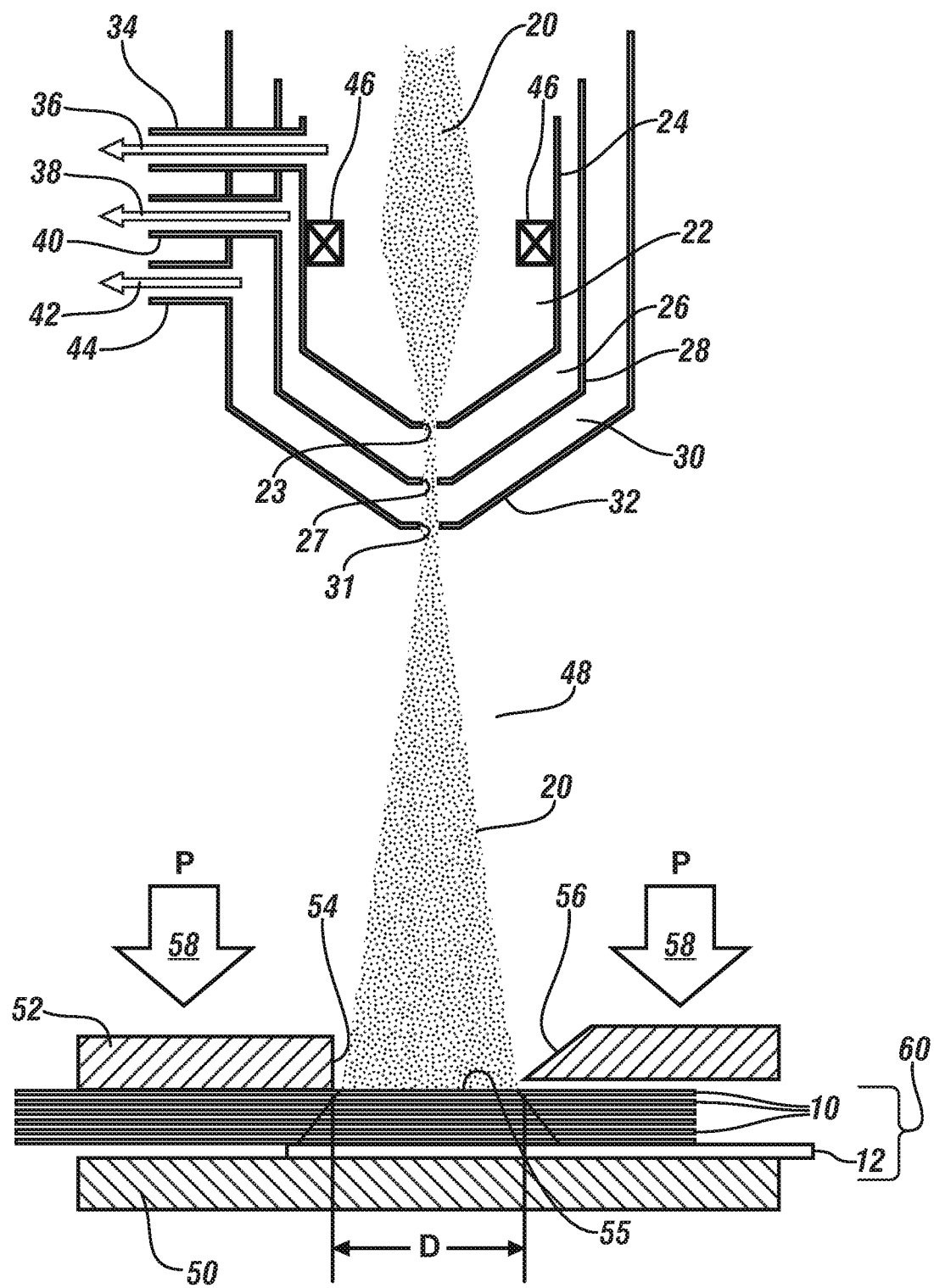
FIG. 4 shows, in side view, a representation of a low pressure electron beam welding process for welding a number of current collector foils and a tab.

Low pressure electron beam welding is performed in a gas atmosphere which may be at up to near-atmospheric pressure. The gas atmosphere, which should be substantially oxygen free to avoid oxide formation, may contain argon and helium. FIG. 4 illustrates such a process in a configuration suitable for welding together a plurality of current collector foils and a tab. Workpiece stack 60 consists of grouped foils 10 and tab 12, which are positioned below electron beam 20, so that electron beam 20 is incident on uppermost foil 10 in an overlap region between the stacked current collector foils 10 and tab 12. No flux is used. Workpiece stack 60 is supported on one surface by backing clamp 50 and compressed by the action of pressure P applied in the direction indicated by arrows 58 applied to windowed clamp 52. Windowed clamp 52 has an opening 55, to allow access of the electron beam to the workpiece stack 60. Opening 55 may be bounded by vertical 54 walls or tapered walls 56 or walls of any other suitable geometry. The electrons are generated by an electron source (not shown) contained within chamber 22 bounded by wall 24 and maintained at a pressure of about $10^{-5}$ Torr by action of vacuum pump (not shown) which exhausts gas as indicated by arrow 36 at orifice 34. The electrons are then accelerated by an anode (not shown) typically maintained at a potential of between about 60 and 150 kV and focused by magnetic coils 46. After passing through orifices 23, 23 and 31 in chamber walls 24, 28 and 32 respectively, the beam enters region 48 maintained at or near atmospheric pressure and containing argon and helium and a substantial absence of oxygen. Due to gas-phase scattering, primarily with the more massive argon atoms, the electron beam disperses. The size of the beam incident on the workpiece stack 60 should be maintained at less than dimension D of opening 55 so that the beam is not directed onto the clamp. This may be done by controlling the stand-off distance between the electron gun and the workpiece or by adjustment of coils 46 or by any combination of these approaches.

Materials selected for the clamp should not react with the molten metal and should not be wet by the molten metal. It is also desirable that the clamp surface be smooth, or even polished, so that no mechanical interaction occurs between the weld and clamp due to infiltration of surface cavities by the liquid metal and subsequent mechanical engagement of the cavity by the solidified metal. Candidate materials may include: steels, cemented carbides, graphite, molybdenum, nickel and nickel based alloys, aluminum oxide, $Al_2O_3$, zirconium oxide $ZrO_2$ among others.

Concentric chambers 22, 26 and 30 are maintained at differing pressures through the action of vacuum pumps (not shown) connected to orifices 34, 38 and 42 respectively for exhausting gases as indicated by arrows 36, 40 and 44 respectively. The dynamic pressure differential is maintained despite chamber to chamber gas flow enabled by orifices 23, 27 and 31. Typical pressures in each of chambers 26 and 30 may be $10^{-2}$ and $10^0$ Torr respectively.

Figure 5:
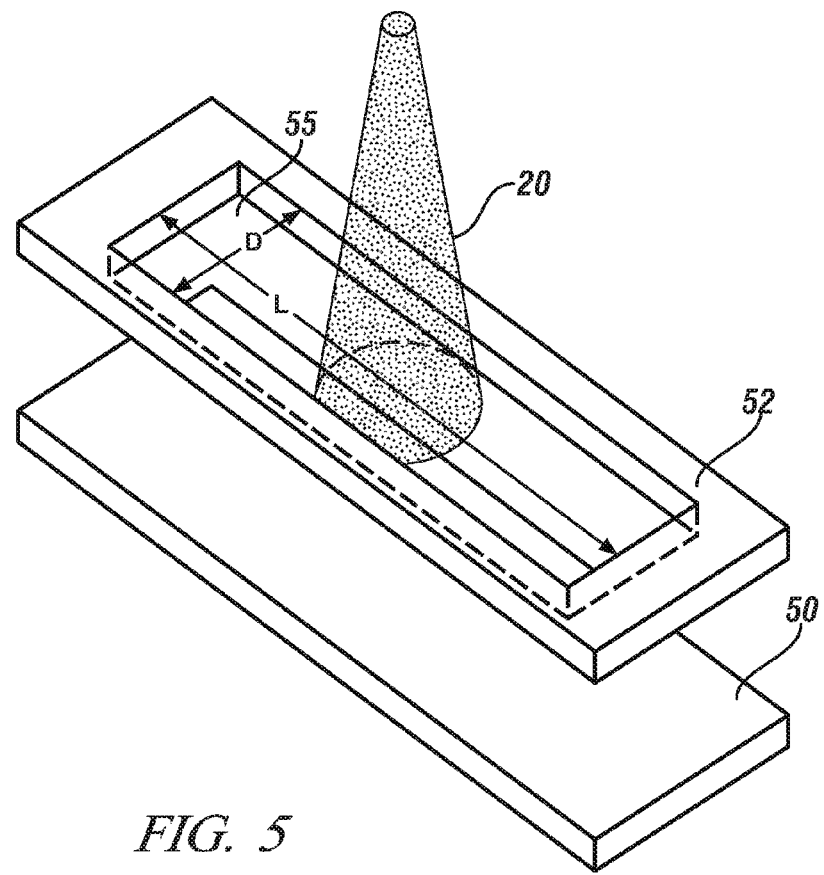
FIG. 5 shows, in perspective view, a windowed clamp for securing a number of current collector foils and a tab such as are shown in FIG. 1 during electron bean welding of the foils and tab.

The power density of electron beam 20 may be sufficient to produce welded seams at welding speeds in excess of 60 m/min in the thin materials under discussion, with a beam dimension suitable for spanning at least one of the window dimensions of window 55 as best seen at FIG. 5. Referring to FIG. 5, electron beam 20, represented as generally conical, is incident on window 55 of windowed clamp 52 and sized to be slightly less than dimension D of window 55. Thus a width of approximately dimension D of workpiece stack 60 (FIG. 3) will be exposed to the electron beam. To expose substantially all of width L of window 55 to the electron beam the beam may be electromagnetically steered, using deflection coils (not shown) across the width or the workpiece may be traversed under a stationary electron beam across width L.

The incident energy of the electron beam may couple to the surface of the workpiece stack 60 (FIG. 3) progressively fusing all of foils 10 into a molten pool. Tab 12 may also be melted and incorporated into the molten pool or the molten pool may in contact with a surface of tab 12, melted only to an extent sufficient to fuse together the tab and molten pool on solidification. The electron beam may traverse the width L of window 55. After passing under the electron beam, the molten pool, supported by backing clamp 50, and confined to opening 55 by opening boundary edge 54 or 56, may solidify to form a fused weld joint across a width L of workpiece stack 60. The fused-together workpiece stack may then be removed from between clamping members 50 and 52. A similar procedure may be followed in welding tabs to a busbar as shown in FIG. 2.

Figure 6:
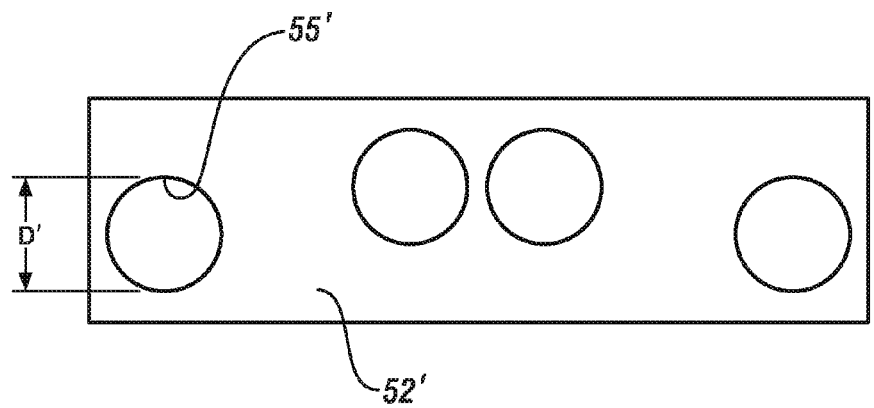
FIG. 6 shows, in plan view, an alternative window pattern in a windowed clamp.

Opening 55, which dictates the plan view weld configuration, has been illustrated as a rectangle which will result in a single, rectangular weld. It will be appreciated that other openings such as circles, chevrons, diamonds and the like may be employed if these weld shapes promote superior resistance to the thermal and mechanical loads encountered by the battery in service. Likewise windowed clamp 52 may incorporate a plurality of windows of any preferred plan view shape or arrangement, for example the circular openings shown as 55' in windowed clamp 52'at FIG. 6, if such a configuration promotes superior weld performance. Also while it is preferred that the extent of the weld pool in at least one direction, for example D in FIG. 5 or D' in FIG. 6, be comparable to the extent of the electron beam, either the electron beam or the clamped workpiece may be scanned or rastered to achieve complete coverage of openings 55 or 55' if required.

The dimension of the electron beam may be adjusted by changing the stand-off distance between chamber wall 32 and the workpiece to promote more electron-gas scattering, or by adjusting the focusing action of magnetic coils 46 to generate a more divergent or convergent beam.

Figure 7:
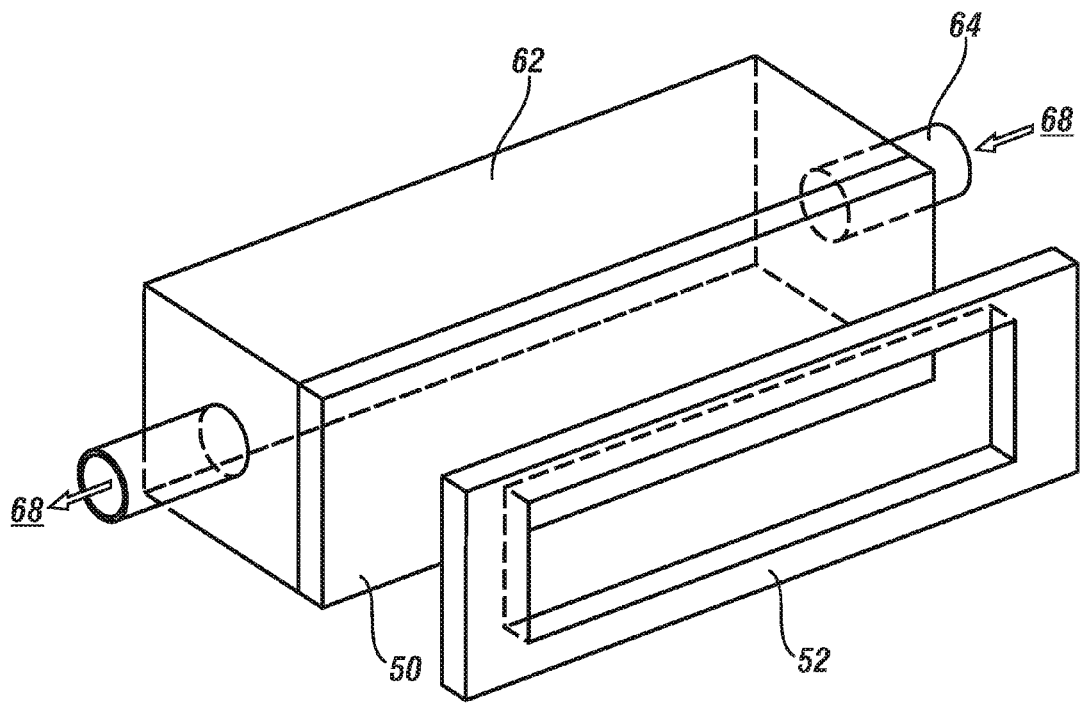
FIG. 7 shows, in perspective view, a windowed clamp for securing a number of current collector foils and a tab during electron beam welding of the foils and tab with provision for fluid cooling the backing plate clamp member.

Under suitably high production rates, there may be inadequate time for either or both of windowed clamp 52 and backing clamp 50 to cool sufficiently during the time between removal of one workpiece and loading of the next. In this circumstance, active cooling may be employed. Shown in FIG. 7 is a backing clamp 50 in thermal contact with an attached cooler incorporating provision for ingress 64 and egress 66 of a flowing coolant, indicated by arrow 68, maintained at a suitable temperature by a chiller (not shown). A similar device may be attached in thermal contact with windowed clamp 52 if desired. Other means of promoting cooling of clamp elements 50 and 52, for example, finned, thermally-conductive heat sinks, well known to those skilled in the art, may also be used.

The practice of the invention has been illustrated through reference to certain preferred embodiments that are intended to be exemplary and not limiting. The full scope of the invention is to be defined and limited only by the following claims.

The invention claimed is:

1. A method of fusion welding a plurality of current collectors, each having an intended joining portion and each being electrically connected to an electrode of a lithium ion battery, to a tab connector with an intended joining portion, in a weld region, the method comprising:

aligning the plurality of current collectors, each ranging in thickness from 10 to 20 micrometers, and the connector tab, to form a workpiece stack with the current collectors being grouped together and positioned on top of the connector tab; positioning the stack in a generally horizontal orientation so that the intended joining portions of all of the current collectors are vertically aligned with the intended joining portion of the tab connector;

clamping and compacting the stack between opposing surfaces of only two clamp members, each being of one-piece construction and each with generally flat stack-contacting surfaces; a first clamp member being in contact with the uppermost current collector in the stack and a second clamp member with a continuous, flat supporting surface in contact with and supporting the connector tab at the bottom of the stack, the first clamp member having at least one through opening for exposing the joining portion of the surface of the uppermost current collector in the stack, the stack-contacting surface of the second clamp being free of surface cavities infiltrateable by liquid metal;

locating the clamp members and stack in a protective, overlying, substantially oxygen-free atmosphere to avoid oxide formation, and irradiating, from above, through the opening in the first clamp member and the protective overlying atmosphere, at least the exposed, joining portion of the surface of the uppermost current collector in the stack with an electron beam to heat and melt the joining portion of the uppermost current collector of the stack; and then, continuing to irradiate the stack for a time predetermined to progressively melt the joining portions of each of the remaining current collectors and, at least a portion of the joining portion of the tab connector thickness in that portion of the stack located in the first clamp member opening, to form, from the joining portions, a molten pool against the remaining solid tab thickness portion or the second clamp member surface, the molten pool extending through the joining location portions of each of the current collectors and being confined within the first clamp member opening, before ceasing electron irradiation and cooling the stack to thereby fuse together those portions of the current collectors and the tab located in the first clamp member opening to form a low resistance fusion welded electrical interconnection between all the stack members at their respective joining portions.

2. The method recited in claim 1, further comprising displacing the first clamp member opening relative to the electron beam or by steering the electron beam until all of the clamp member opening is exposed to the electron beam.

3. The method recited in claim 1 in which the current collectors comprise copper.

4. The method recited in claim 1 in which the current collectors comprise aluminum.

5. The method recited in claim 1 in which the atmosphere comprises argon and helium.

6. The method recited in claim 1 in which the first clamp member opening is rectangular.

7. The method recited in claim 1 in which the first clamp member opening is circular.

8. The method recited in claim 1 in which the clamp members are fabricated of one or more of the group consisting of steel, cemented carbide, graphite, molybdenum, nickel and nickel based alloys, aluminum oxide, and zirconium oxide.

9. A method of fusion welding a plurality of tab connectors, each electrically connected to a plurality of current collectors of a plurality of lithium ion cell electrodes, to a 500 to 1000 micrometer thick busbar, the method comprising:

aligning the plurality of tab collectors and the 500 to 1000 micrometer thick busbar to form a work piece stack;

clamping and compacting the stack between opposing, generally planar surfaces of only two clamp members, each being of one-piece construction, one member having at least one through opening with an extent for access to a portion of the stack surface and a second clamp member having a generally flat supporting surface free of surface cavities infiltrateable by liquid metal for supporting the stack;

positioning the stack in a generally horizontal orientation with the clamp member with the through opening being uppermost;

locating the clamp members and stack in a protective, overlying, substantially oxygen-free atmosphere to avoid oxide formation, and exposing at least a portion of the accessible portion of the stack surface to an electron beam, the electron beam being positioned above the stack and of suitable power density to heat and melt the stack, for a time sufficient to heat and melt the stack and fuse together the tab connectors and the busbar; and, optionally, traversing the beam across the entire clamp member through opening to melt and fuse together the tab connectors and the busbar located in the accessible portion of the stack to form, a low resistance fusion welded electrical interconnection between the tab connectors and the busbar, the fusion welded electrical interconnection having an extent equal to, or less than, the extent of the clamp opening.

10. The method recited in claim 9 in which the current collectors comprise copper.

11. The method recited in claim 9 in which the current collectors comprise aluminum.

12. The method recited in claim 9 in which the atmosphere comprises argon and helium.

13. The method recited in claim 9 in which the clamp member through opening is rectangular.

14. The method recited in claim 9 in which the clamp member through opening is circular.

15. The method recited in claim 9 in which the clamp members are fabricated of one or more of the group consisting of steel, cemented carbide, graphite, molybdenum, nickel and nickel based alloys, aluminum oxide and zirconium oxide.

16. The method recited in claim 9 in which the clamp comprises the one member comprising an opening and the second member comprising a stack-contacting surface and a flow-through conduit in thermal communication with the stack-contacting surface and the second clamp member is cooled by flowing coolant through the conduit.

* * * * *